(12) United States Patent
Kogiso et al.

(10) Patent No.: US 6,496,002 B1
(45) Date of Patent: Dec. 17, 2002

(54) ROTATION DETECTOR HAVING A PLURALITY OF MAGNETISM DETECTION ELEMENTS, A PLURALITY OF MAGNETIC RESISTORS WHICH ARE ABLE TO SWITCH THE RESISTANCE FROM GREAT TO SMALL AND VICE-VERSA

(75) Inventors: Katsuya Kogiso, Aichi (JP); Yasushi Nishibe, Aichi (JP); Masahiro Taniguchi, Aichi (JP); Shinji Usui, Aichi (JP)

(73) Assignee: Kabushiki Kaisha Tokai Rika Denki Seisakusho (JP)

( * ) Notice: Subject to any disclaimer, the term of this patent is extended or adjusted under 35 U.S.C. 154(b) by 0 days.

(21) Appl. No.: 09/522,243

(22) Filed: Mar. 9, 2000

(30) Foreign Application Priority Data

Mar. 11, 1999 (JP) ............................................ 11-065166
May 17, 1999 (JP) ............................................ 11-135838

(51) Int. Cl.[7] ............................ G01B 7/14; G01B 7/30; G01R 33/06; H01L 43/08; H02K 11/00; H02K 21/00; H02K 27/26; H02K 27/38
(52) U.S. Cl. ............................ 324/207.21; 324/207.25; 310/68 B; 310/152; 310/154.01; 310/154.06; 310/154.24
(58) Field of Search ..................... 310/156.06, 156.07, 310/156.15, 90.5, 68 B, 154; 318/254, 701; 324/207.21, 207.25, 207.13, 207.2; 338/32 R

(56) References Cited

U.S. PATENT DOCUMENTS

| 4,401,944 A | * | 8/1983 | Narimatsu et al. ...... 324/207.21 |
| 4,472,665 A | * | 9/1984 | Tanikoshi ................... 318/254 |
| 4,785,241 A | * | 11/1988 | Abiko et al. ................ 324/208 |
| 4,922,753 A | * | 5/1990 | Idogaki et al. ............. 73/516 R |
| 4,944,028 A | * | 7/1990 | Iijima et al. ........... 324/207.12 |
| 5,168,186 A | * | 12/1992 | Yashiro ....................... 310/47 |
| 5,239,263 A | * | 8/1993 | Iwata et al. .............. 324/207.2 |
| 5,243,279 A | * | 9/1993 | Bajat et al. ............... 310/68 B |
| 5,351,005 A | * | 9/1994 | Rouse et al. ........... 324/207.21 |
| 5,359,287 A |   | 10/1994 | Watanabe et al. |
| 5,508,611 A | * | 4/1996 | Schroeder et al. ......... 174/52.1 |
| 5,568,048 A | * | 10/1996 | Schroeder et al. ..... 324/207.21 |
| 5,585,775 A | * | 12/1996 | Ishishita ................ 324/207.21 |
| 5,734,241 A | * | 3/1998 | Okada et al. ............... 318/366 |
| 5,736,802 A | * | 4/1998 | Ueyama et al. ............ 310/90.5 |
| 5,760,512 A | * | 6/1998 | Ohi et al. ...................... 310/91 |
| 5,872,442 A | * | 2/1999 | Gotou ........................ 318/727 |
| 5,952,824 A | * | 9/1999 | Shinjo et al. .......... 324/207.21 |

(List continued on next page.)

FOREIGN PATENT DOCUMENTS

| DE | 2730309 | 1/1979 |
| DE | 4241106 | 6/1993 |
| FR | 2444274 | 7/1980 |

Primary Examiner—Nestor Ramirez
Assistant Examiner—Julio C. Gonzalez
(74) Attorney, Agent, or Firm—Sawyer Law Group LLP

(57) ABSTRACT

A rotation detector includes a rotor having a shaft. Projections are located at predetermined intervals on the periphery of the rotor and extend in an axial direction. Magnets are located between the projections and the shaft. The flux of each magnet is detected by a corresponding magnetism detection element. Each magnetism detection element has magnetic resistors. Movement of the projections changes the direction of flux of the magnets. Each resistor is switched between a first state, in which its magnetic resistance is great, and a second state, in which its magnetic resistance is small, in accordance with the change of the flux direction. The resistors are divided into two groups. The groups are substantially symmetrical relative to a centerline of the groups such that, when the direction of the flux changes, the resistors in one group are in the opposite state from the resistors in the other group. The centerline of changes in the direction of the flux matches the centerline of the resistor groups.

9 Claims, 7 Drawing Sheets

U.S. PATENT DOCUMENTS 6,020,736 A * 2/2000 Aoyama et al. ....... 324/207.21
6,144,126 A * 11/2000 Kodama ................... 310/68 B
6,166,470 A * 12/2000 Miyazawa et al. .......... 310/181
6,169,396 B1 * 1/2001 Yokotani et al. ....... 324/207.21
6,175,174 B1 * 1/2001 Takahashi .................. 310/90.5
6,184,680 B1 * 2/2001 Shinoura et al. ....... 324/207.21
6,271,663 B1 * 8/2001 Kanbe et al. .......... 324/207.21

* cited by examiner

ROTATION DETECTOR HAVING A PLURALITY OF MAGNETISM DETECTION ELEMENTS, A PLURALITY OF MAGNETIC RESISTORS WHICH ARE ABLE TO SWITCH THE RESISTANCE FROM GREAT TO SMALL AND VICE-VERSA

BACKGROUND OF THE INVENTION

The present invention relates to a rotation detector, and more specifically, to a rotation detector including a rotor having magnetic sensing elements.

FIG. 10 illustrates how an absolute position detection type detector detects rotational position. The rotation detector includes a rotor 30, which is fixed to a rotating shaft and integrally rotates with the shaft. N pole zones 32 and S pole zones 33 are alternately formed at sixty degree intervals on the rotor 30 in a circumferential direction. At positions facing the rotor 30, first to third magnetic resistance elements 31 are arranged around the axis O of the rotor 30 at forty-degree intervals. Each of the first to third resistance elements 31 detects the N pole zone 32 and the S pole zone 33, which alternately pass by the resistance elements 31 at sixty-degree intervals during the rotation of the rotor 30.

When the N pole zone 32 is detected, the first to third resistance elements 31 respectively output H-level signals SG1, SG2, SG3. When the S pole zone 33 is detected, the resistance elements 31 respectively output L-level signals SG1, SG2, SG3. When each resistance element 31 detects a change from the N pole zone 32 to the S pole zone 33, each of the signals SG1, SG2, SG3 changes from the H level to the L level. Contrarily, when each resistance element 31 detects a change from the S pole zone 33 to the N pole zone 32, each of the signals SG1, SG2, SG3 changes from the L level to the H level.

As shown in FIG. 10, the signals SG1, SG2, SG3 of the resistance elements 31 change gradually between the L and H levels. The reason for this is that the direction of magnetic flux changes gradually when the detected zone changes from the N pole zone 32 to the S pole zone 33. Three comparators (not shown) respectively receive the signals SG1, SG2, SG3 and adjust the waveforms of the signals SG1, SG2, SG3, thus generating detection signals S1, S2, S3 that change sharply between the L and H levels.

More specifically, each comparator compares an output signal with a reference value, which is a middle level between the H level and the L level. When the output signal is greater than the reference value, the comparator generates an H level detection signal S1, S2, S3. When the output signal is lower than the reference value, the comparator generates an L level detection signal S1, S2, S3. The reference value is the level of the signals SG1, SG2, SG3 output when the border between the N pole zone 32 and the S pole zone 33 passes by each of the first to third resistance elements 31. When any one of the detection signals S1, S2, S3 changes from the L level to the H level or from the H level to the L level, the rotational position of the rotor 30 (or rotation shaft) is determined based on the state of the other detection signals. In the case of FIG. 10, the rotational position (absolute position) is detected in the range of zero to hundred twenty degrees at intervals of twenty degrees.

However, it is difficult to precisely form the N pole zone 32 and the S pole zone 33 alternately at sixty-degree intervals on the rotor 30 in the circumferential direction. Accordingly, the rotational position is not detected at twenty-degree intervals with precision at the point when the detection signals S1, S2, S3 change from the L level to the H level or from the H level to the L level.

The objective of the present invention is to provide a rotation detector that detects rotational position with high precision.

SUMMARY OF THE INVENTION

To achieve the foregoing and other objectives and in accordance with the purpose of the present invention, a rotation detector is provided. The rotation detector includes a rotor having a shaft, magnets and magnetism detection elements. Axial projections are located at predetermined intervals about the rotor. The magnets are located between the projections and the shaft. Each magnetism detection element detects magnetism of corresponding one of the magnets and includes a plurality of magnetic resistors. A movement of the projections changes the flux of the magnets. Each resistor is switched between a first state, in which its resistance is great, and a second state, in which its resistance is small. The resistors are divided into two groups. The groups are substantially symmetrical relative to a group centerline such that, when the direction of the flux changes, the resistors in one group are in the opposite state from that of the resistors in the other group. The centerline of changes in the direction of the flux caused by movements of the projections matches the group centerline.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A detection circuit for the rotation detector 1 according to one embodiment of the present invention will now be described with reference to FIGS. 1 to 9. The rotation detector 1 includes a rotor 2, which is preferably made of a metal plate, and a magnetism-detecting member 3. The rotor 2 rotates integrally with a steering shaft 4 about its axis O.

Figure 1:
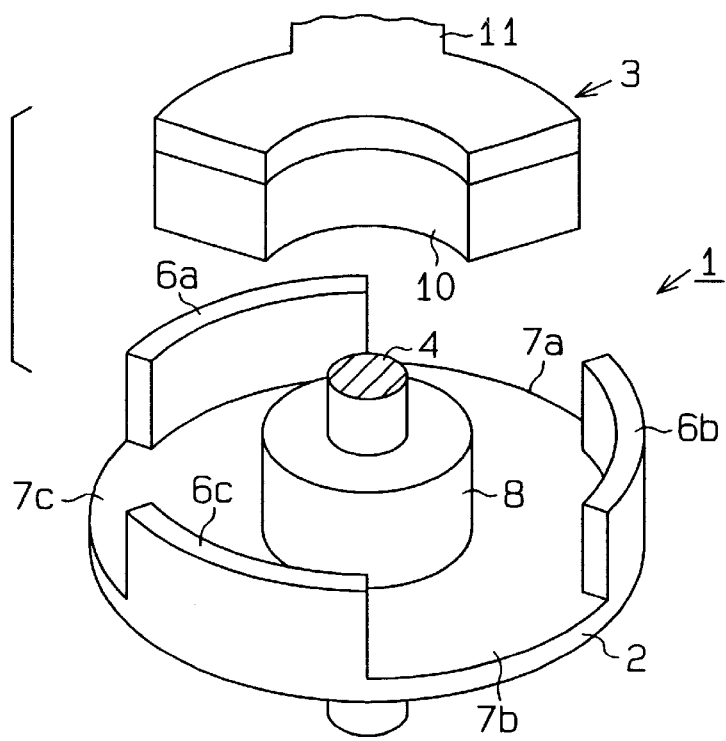
FIG. 1 is a partial exploded perspective view illustrating a rotation detector according to one embodiment of the present invention.
Figure 2:
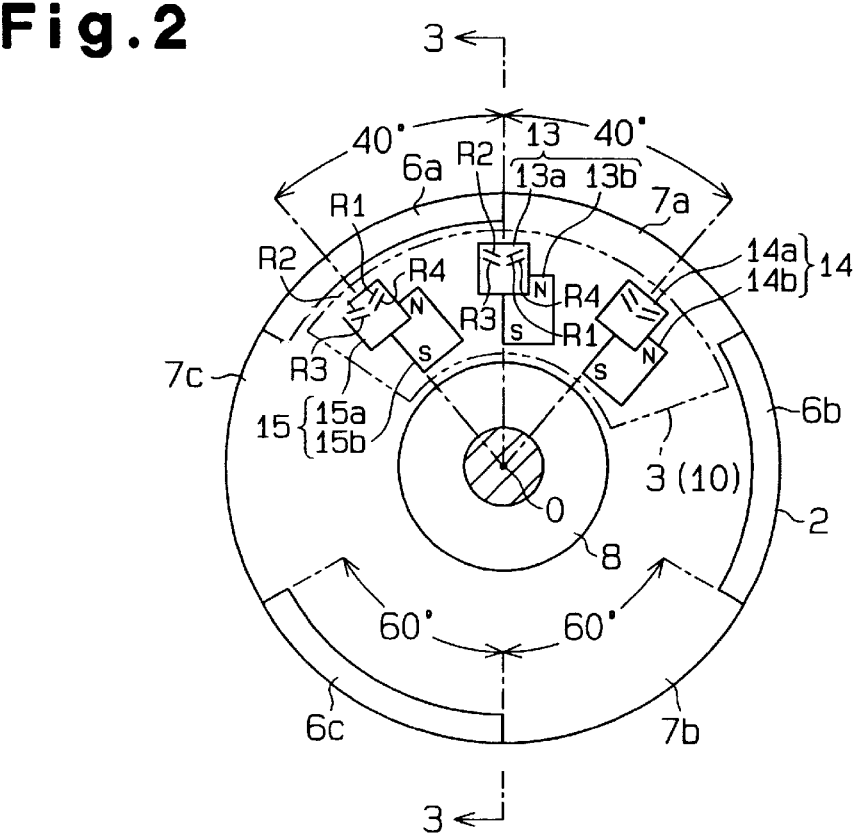
FIG. 2 is a plan view of the rotation detector of FIG. 2.

As shown in FIGS. 1 and 2, the rotor 2 includes three arcuate magnetic path changer projections 6a, 6b, 6c. The projections 6a, 6b, 6c extend axially from the peripheral surface of the rotor 2 and are angularly spaced apart at predetermined intervals. The angle from one end to the other of each changer projection 6a, 6b, 6c with respect to the axis O is preferably sixty degrees. Accordingly, the space between the changer projections 6a, 6b, 6c with respect to the axis O is also sixty degrees. Thus, the changer projections 6a, 6b, 6c and vacant zones 7a, 7b, 7c, on which no changer projections are formed, exist alternately on the periphery of the rotor 2. Further, a cylindrical hub 8, which forms a magnetic path, is located on the rotor 2. The hub 8 extends from the center of the rotor 2 in the same direction as the changer projections 6a to 6c.

Figure 3:
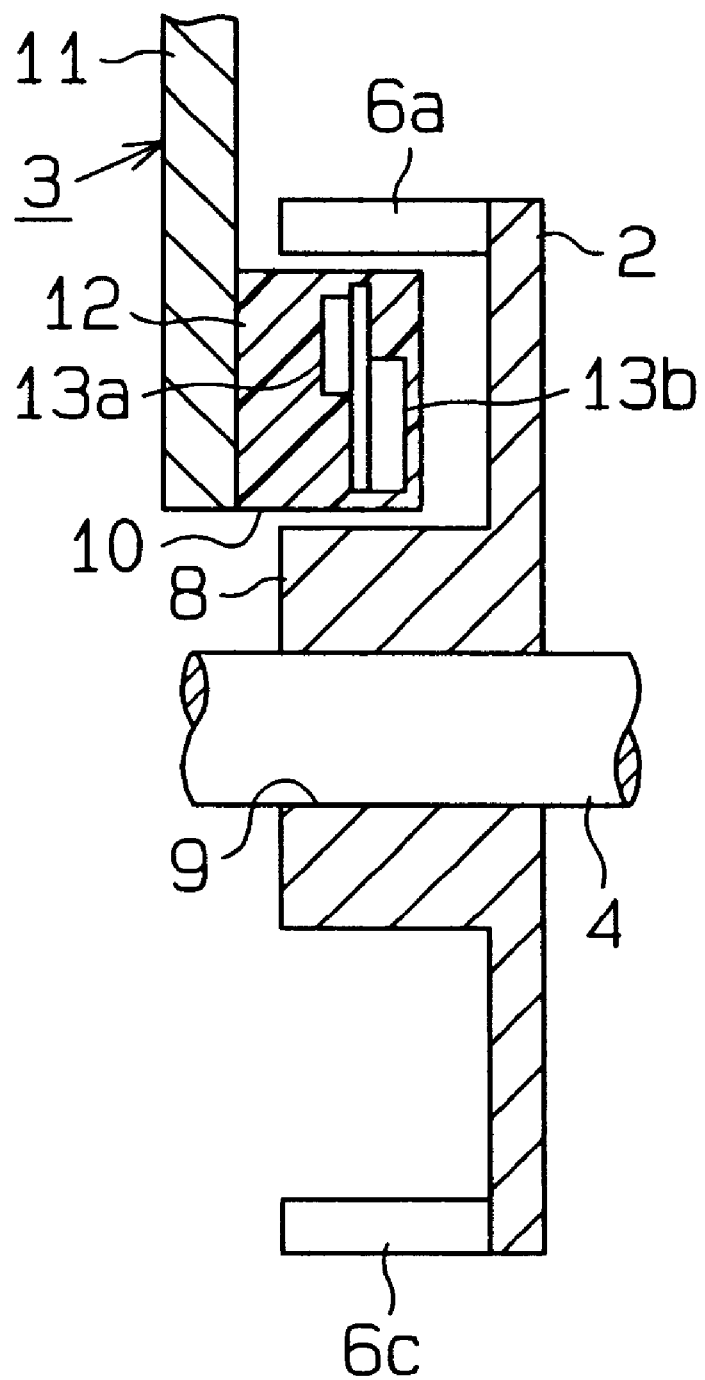
FIG. 3 is a partial cross sectional view of the rotation detector of FIG. 2 taken along line 3—3 of FIG. 2.

FIG. 3 is a cross-sectional view taken along line 3—3 of FIG. 2, or along a plane that includes the axis O of the rotor 2. The cross section of each changer projections 6a, 6b, 6c, the rotor 2 and the hub 8 forms a U-shape. The hub 8 includes a through hole 9 in which the steering shaft 4 is received and fixed.

The detecting member 3 includes a support arm 11 and a detecting body 10, which is attached to the distal end of the support arm 11. The proximal end of the support arm 11 is secured to a fixing member (not shown). The detecting body is accommodated in the U-shaped space formed by the projections 6a, 6b, 6c, the rotor 2 and the hub 8. The detecting body 10 includes first to third magnetism detectors 13, 14, 15, which are enclosed in a resin molding material 12 (See FIG. 2).

The first magnetism detector 13 includes a first magnetic resistance element 13a and a first bias magnet 13b, which is arranged near the resistance element 13a. The first bias magnet 13b includes an S pole and an N pole and is arranged such that the S pole faces the axis O and the N pole faces the direction opposite the axis O. The first bias magnet 13b is offset from the first resistance element 13a in the clockwise direction (from the viewpoint of FIG. 2) about the axis O and is closer to the axis O than the first resistance element 13a.

Figure 4A:
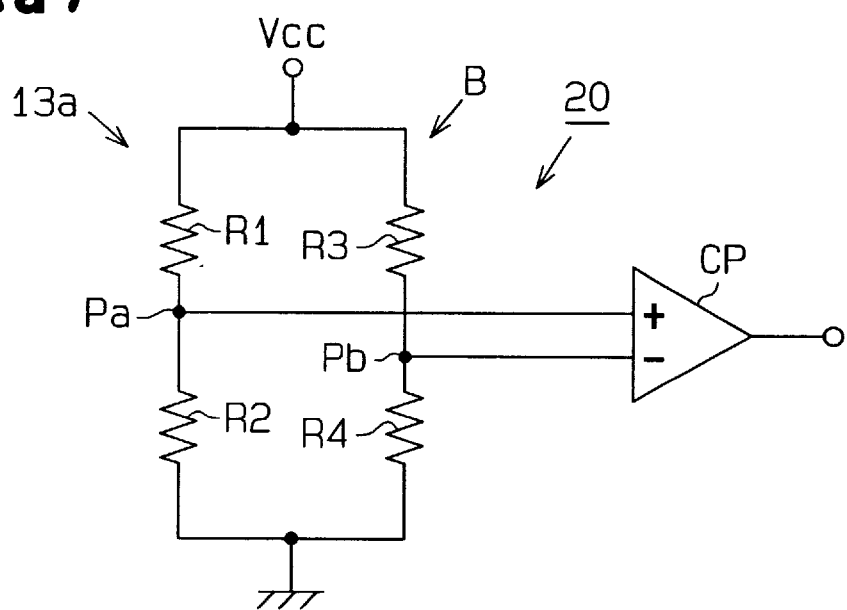
FIG. 4(a) is an electrical block diagram illustrating the detection circuit of the sensor shown in FIG. 1 when a magnetic flux is not acting on the detection circuit.
Figure 4B:
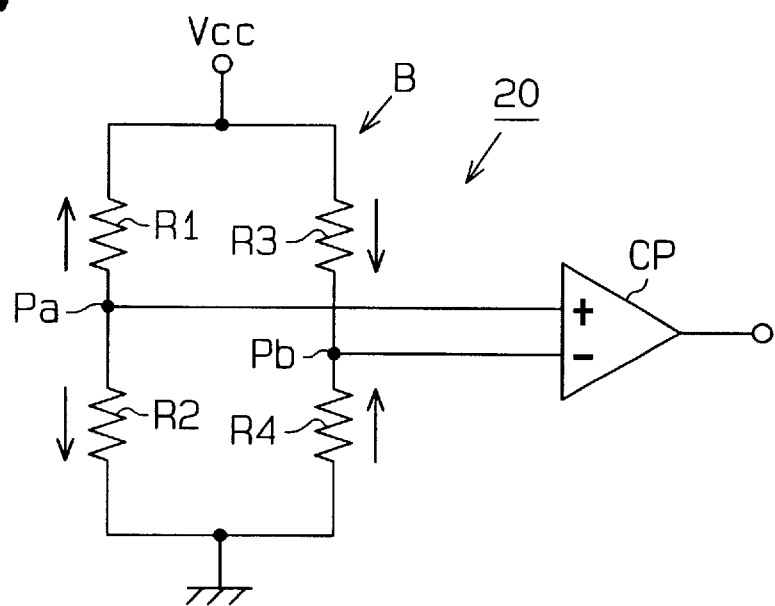
FIG. 4(b) is an electrical block diagram like FIG. 4(a), when a magnetic flux is acting on the detection circuit.

The first resistance element 13a is a magnetism detection element, which generates a detection voltage. The detection voltage varies in accordance with the direction of magnetic flux of the first bias magnet 13b. As shown in FIGS. 4(a) and 4(b), the first resistance element 13a includes resistors R1, R2, R3, R4, the resistances of which vary respectively in accordance with the direction of magnetic flux.

Figure 7:
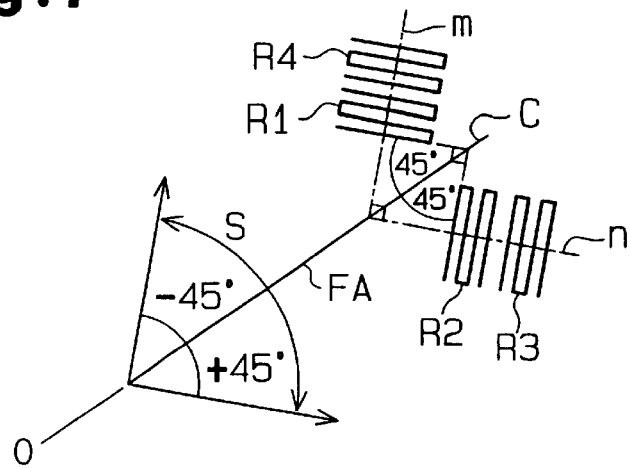
FIG. 7 is a diagram illustrating the arrangement of magnetic resistors.

FIG. 7 illustrates the arrangement of the resistors R1 to R4. As shown in FIG. 7, a first group, which includes the resistors R1 and R4, is arranged in the direction of a first line m. A second group, which includes the resistors R2 and R3, is arranged in the direction of a second line n. In FIG. 7, the lines m and n represent lines of arrangement, or arrangement directions, of the resistors R1, R4 and R2, R3, respectively.

Figure 5:
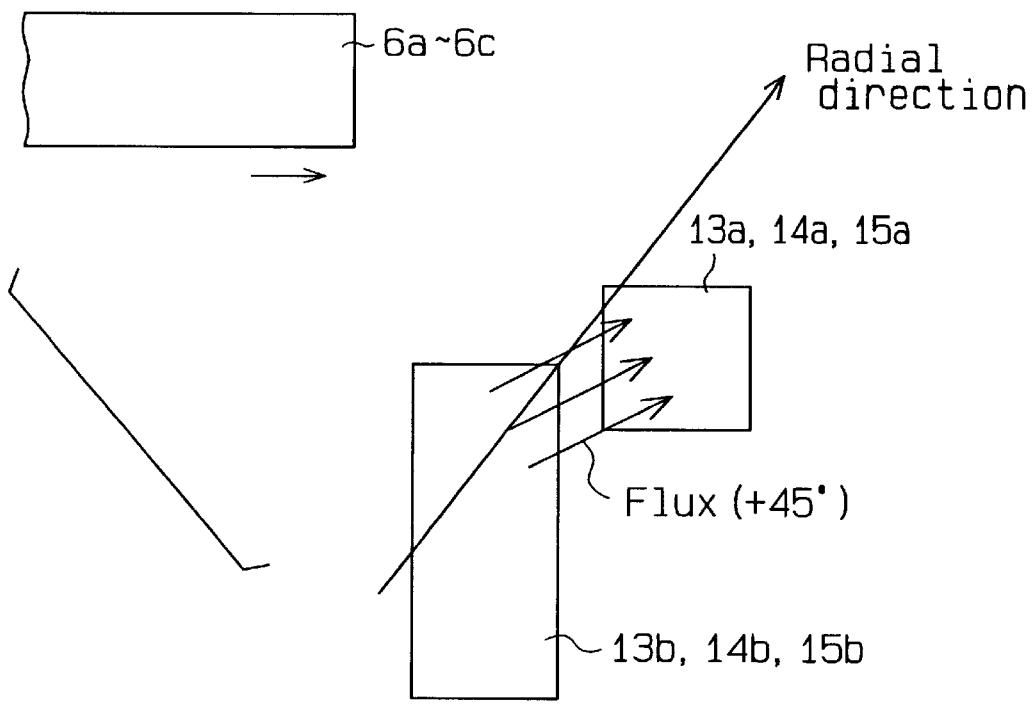
FIG. 5 is a diagram illustrating the direction of magnetic flux when a magnetic path changer projection is not facing a bias magnet.
Figure 6:
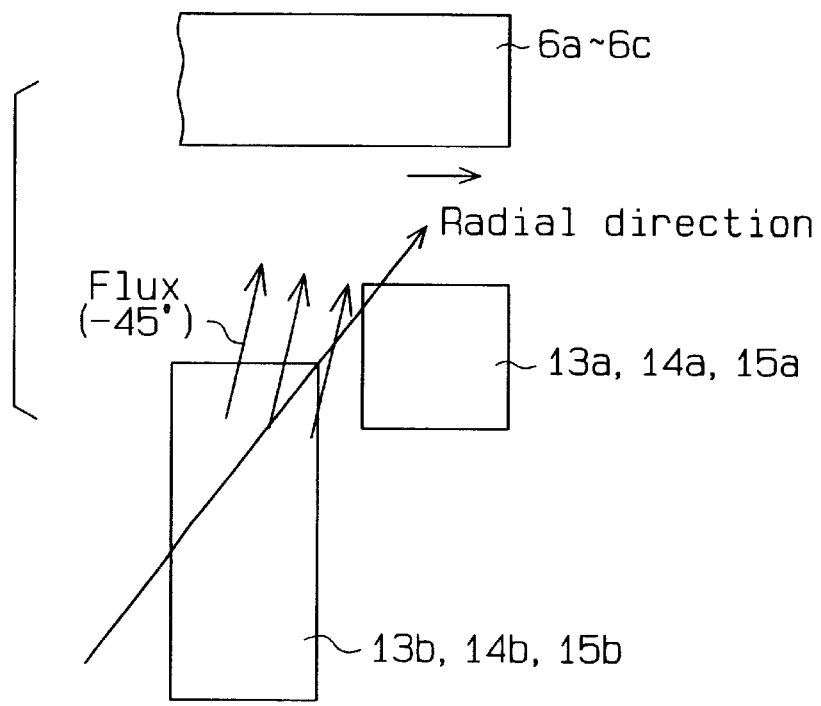
FIG. 6 is a diagram like FIG. 5 illustrating the direction of magnetic flux when a magnetic path changer projection is facing a bias magnet.

FIGS. 5 to 7 are views looking along the axis of the shaft 4 from the surface of the rotor 2 toward the resistors R1 to R4, and FIG. 2 is a view from the opposite side of the rotor 2. Thus, the arrangement of the resistors R1, R4 and R2, R3 is opposite in FIG. 2 with respect to FIGS. 5 to 7.

The resistors R1 to R4 are formed on a substrate made of Ni—Co thin film. The current paths of the resistors R1 to R4 reverses direction, or runs in alternating directions, and longer segments of the current paths run perpendicular to the lines m and n. When the temperature is constant, the resistors R1 to R4 have the same resistance. The resistances of the resistors R1 to R4 increase when the ambient temperature increases. The rate of change in the temperature of the resistors R1 to R4 is preferably the same as the rate of ambient temperature change.

In this embodiment, a group centerline C of the resistors R1 to R4 matches a centerline of the range of flux change FA. The group centerline C is the bisector of the angle defined by the lines m and n. That is, the first group R1, R4 and the second group R2, R3 are substantially symmetrical about the bisector. Also, the lines m, n are each inclined by forty-five degrees from the flux centerline FA.

As shown in FIG. 7, the range S of change of flux direction is from forty-five degrees to minus forty-five degrees relative to a radial line extending from the axis O.

When the direction of the flux is inclined by forty-five degrees relative to the radial line, the resistors R1 and R4 are in a first state, in which the resistors R1 and R4 have relatively great resistances. At this time, the other resistors R2 and R3 are in a second state, in which the resistors R2 and R3 have relatively small resistances. When the direction of the flux is inclined by minus forty-five degrees relative to the radial line, the resistors R1 and R4 are in the second state, in which the resistors R1 and R4 have relatively small resistances. At this time, the other resistors R2 and R3 are in the first state, in which the resistors R2 and R3 have relatively great resistances. These states alternate with changes of the flux. In FIG. 7, the clockwise direction is defined as a positive angular direction.

As shown in FIGS. 4(a) and 4(b), the resistors R1 to R4 are connected to form a bridge circuit B. A junction Pa between the resistors R1 and R2 is connected to a noninverting input terminal of a comparator CP. A junction Pb between the resistor R3 and R4 is connected to an inverting input terminal of the comparator CP. The comparator CP and the bridge circuit B form a detection circuit 20.

Figure 9:
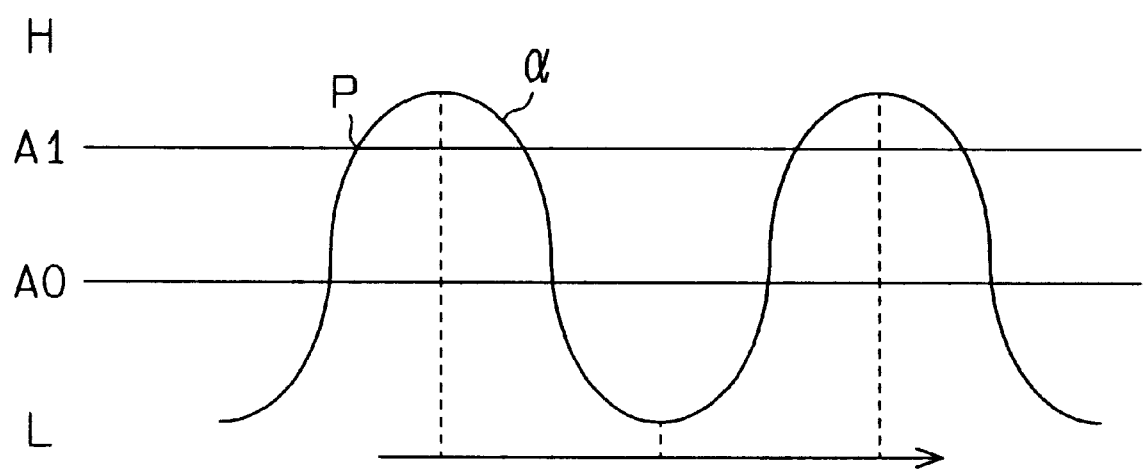
FIG. 9 shows an output voltage waveform detected at a junction in a detection circuit.
Figure 10:
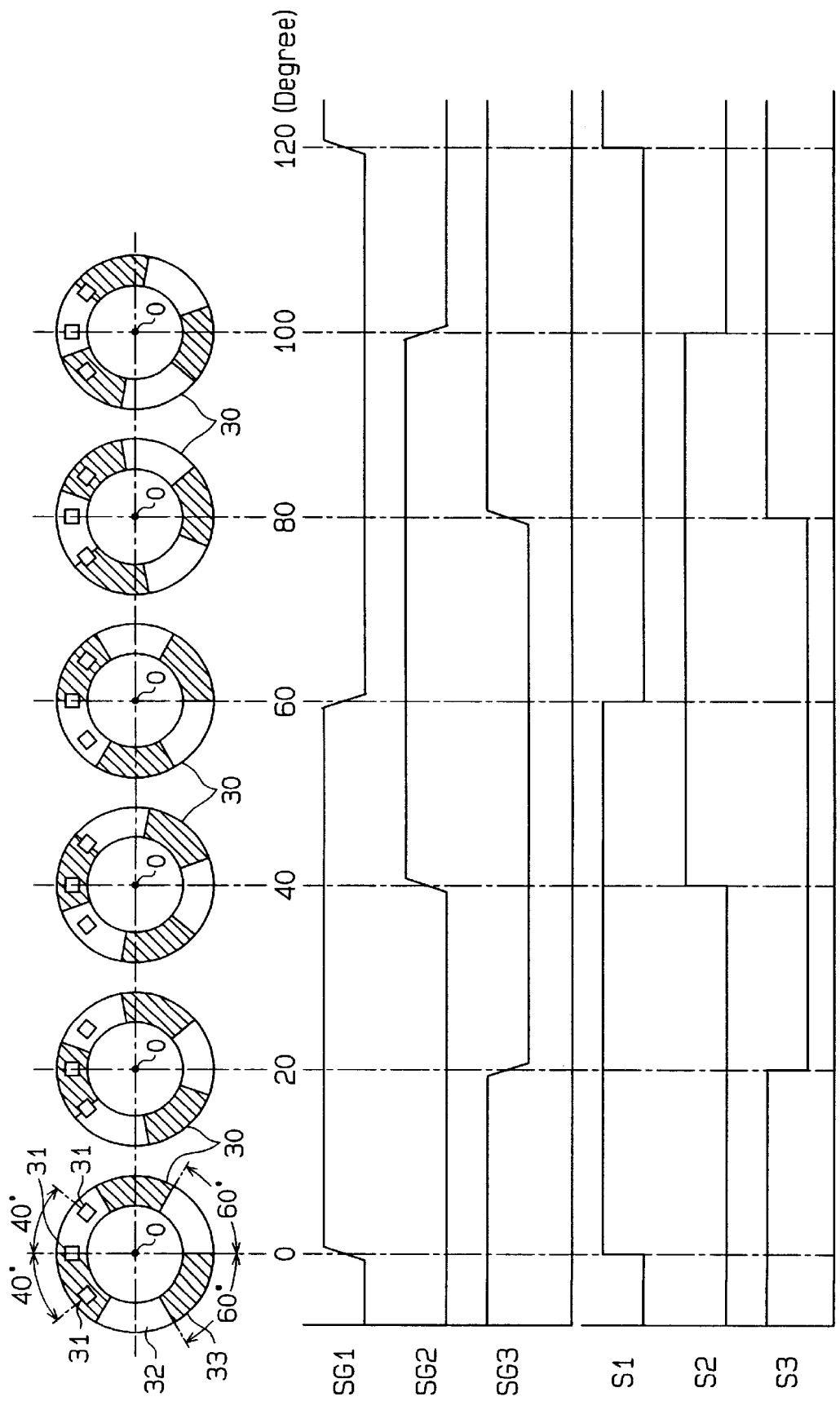
FIG. 10 is a waveform diagram illustrating the operation of a prior art rotation detector.

When the direction of flux passing through the resistors R1 and R4 is inclined by minus forty-five degrees relative to the radial line, the electric potential of the junction Pa of the bridge circuit B is greater than a center output value A0 of the junction Pb and becomes high, or H level, as shown in FIG. 9. In the graph of FIG. 9, the output center value A0 represents half the saturation output level at the junction Pa. If the direction of flux is forty-five degrees relative to the radial direction, the electric potential of the junction Pa becomes low, or falls below the center value A0 to the L level (see FIG. 9).

The second magnetism detector 14 includes a second magnetic resistance element 14a and a second bias magnet 14b. The arrangement of the magnetic resistance element 14a and the second bias magnet 14b is the same as that of the first magnetic element 13a and the first bias magnet 13b. The second magnetic resistance element 14a and the second bias magnet 14b are angularly spaced apart from the first magnetic resistance element 13a and the first bias magnet 13b, respectively, by forty degrees in the clockwise direction about the axis O.

The second resistance element 14a includes four resistors, which have the same structures as the four resistors R1, R2, R3, R4 of the first resistance element 13a. The resistors of the second element 14a are also connected to one another in the same manner as the resistors R1 to R4. The resistors of the second element 14a are therefore referred to by the same numbers R1 to R4 like the resistors R1 to R4 of the first element 13a.

The resistors R1 to R4 of the second resistance element 14a form a four-terminal bridge circuit B like the first resistance element 13a. The second resistance element 14a forms a detection circuit 20 with a comparator CP. The operation of the detection circuit 20 and the bridge circuit B of the second element 14a is the same as that of the detection circuit 20 of the first resistance element 13a.

The third magnetism detector 15 includes a third magnetic resistance element 15a and a third bias magnet 15b. The arrangement of the magnetic resistance element 15a and the second bias magnet 15b is the same as that of the first magnetic element 13a and the first bias magnet 13b. The third magnetic resistance element 15a and the third bias magnet 15b are angularly spaced apart from the first magnetic resistance element 13a and the first bias magnet 13b, respectively, by forty degrees in the counterclockwise direction about the axis O.

The third resistance element 15a includes four resistors, which have the same structures as the four resistors R1, R2, R3, R4 of the first resistance element 13a. The resistors of the third element 15a are also connected to one another in the same manner as the resistors R1 to R4 of the first element 13a. The resistors of the third element 15a are therefore referred to by the same numbers R1 to R4 like the resistors R1 to R4 of the first element 13a.

The resistors R1 to R4 of the third resistance element 15a form a four-terminal bridge circuit like the first resistance element 13a. The third resistance element 15a forms a detection circuit 20 with a comparator CP. The operation of the detection circuit 20 of the third element 15a is the same as that of the detection circuit 20 of the first resistance element 13a.

For example, if the magnetic path changer projection 6a is located on a radial line extending from the axis O toward the N pole of the third bias magnet 15b as shown in FIGS. 2 and 6, the flux of the third bias magnet 15b is inclined from the radial line by minus forty-five degrees. This is because the changer projection 6a, the rotor 2 and the hub 8 define a U-shaped magnetic path and the flux of the bias magnet 15b is attracted from the N pole to the changer projection 6a. As a result, the flux of the third bias magnet 15b is directed minus forty-five degrees from the projection 6a, or from the radial line. That is, the projections 6a to 6c form a magnetic path. In this case, the voltage at the junction Pa of the four-terminal bridge circuit B is high, or H level.

If one of the magnetic path changer projections 6a to 6c does not lie on a radial line that extends from the axis O toward the N pole of the second bias magnet 14b, as shown in FIGS. 2 and 5, the flux of the second bias magnet 14b is inclined from the radial line by forty-five degrees. Therefore, the flux is not attracted by the projections 6a to 6c. As a result, the flux extends forty-five degrees from the radial line. In this case, the voltage at the junction Pa of the four-terminal bridge circuit B is L level.

When the first bias magnet 13b moves from the vacant zone 7a to the edge of the projection 6a in FIG. 2, the direction of flux of the first bias magnet 13b changes from minus forty-five degrees to forty-five degrees relative to the radial line as shown in FIGS. 5 and 6. In this case, the voltage at the junction Pa of the four-terminal bridge circuit B changes from L level to H level.

When the first bias magnet 13b moves from a position facing the projection 6a and passes an end of the projection 6a, the direction of flux of the first bias magnet 13b changes from minus forty-five degrees to forty-five degrees relative to the radial line. In this case, the voltage at the junction Pa of the four-terminal bridge circuit B change from H level to L level.

The junction Pa outputs a voltage signal in this manner. The comparator CP of the detection circuit 20 compares the voltage of the junction Pa with the voltage at the junction Pb to adjust the waveform of the voltage signal of the junction Pa, thus generating a detection signal.

The above described rotation detector 1 has the following characteristics and advantages.

The rotor 2 of the illustrated embodiment has the magnetic path changer projections 6a to 6c, which are spaced equally in the circumferential direction. Also, the bias magnets 13b, 14b, 15b are arranged in predetermined directions relative to the rotor 2. The magnetism detection element, which are the magnetic resistance elements 13a, 14a, 15a in the illustrated embodiment, detect the magnetism of the bias magnets 13b, 14b, 15b. Each of the resistance elements 13a, 14a, 15a has the magnetic resistors R1 to R4. Each set of the resistors R1 to R4 is switched between the first state and the second state. In the first state, the resistances of the resistors R1 to R4 are increased in accordance with a change in the flux of the bias magnets 13b, 14b, 15b due to movement of the changer projections 6a to 6c. In the second state, the resistances of the resistors R1 to R4 are decreased in accordance with a change in the flux of the bias magnets 13b, 14b, 15b due to movement of the changer projections 6a to 6c. The magnetic resistors R1 to R4 are divided into two groups. The groups of the resistors R1 to R4 are substantially symmetric with respect to a radial line so that the resistance status of the resistors in one group is opposite to the resistance status of the resistors in the other group. The resistors R1 to R4 are electrically connected to form the bridge circuit B.

When the changer projections 6a to 6c are moved, the flux of the bias magnet 13b, 14b, 15b is changed. The center of the flux change is designated as FA. The magnetic resistors R1 to R4 are arranged such that the centerline C of the resistors R1 to R4 matches with flux change centerline FA.

As a result, the output level is greatly changed for a relatively small flux change. Even if the ambient temperature or other environment is changed, the rotation angle is accurately detected.

In the illustrated embodiment, the resistors R1 to R4 are arranged such that the directions of arrangement of each group are perpendicular to each other. Each of the resistors R1 to R4 is alternately folded to zigzag, such that long segments of the resistors are perpendicular to the lines m, n. This improves the accuracy of rotation detection.

In the illustrated embodiment, the arrangement lines m, n of the magnetic resistors R1 to R4 are angled by approximately forty-five degrees relative to the centerline of flux change FA. If the resistors R1 to R4 are arranged parallel to the direction of flux, the current through the resistors R1 to R4 is decreased, that is, the resistances are maximized. If the resistors R1 to R4 are arranged perpendicular to the direction of flux, current flows easily through the resistors R1 to R4, that is, the resistances are minimized. Therefore, setting the resistors R1 to R4 at an angle of forty-five degrees relative to the flux change centerline FA permits the resistances of the resistors R1 to R4 to change from the minimum value to the maximum value in accordance with changes of flux. As a result, the rotation angle is detected in a stable manner.

Figure 8A:
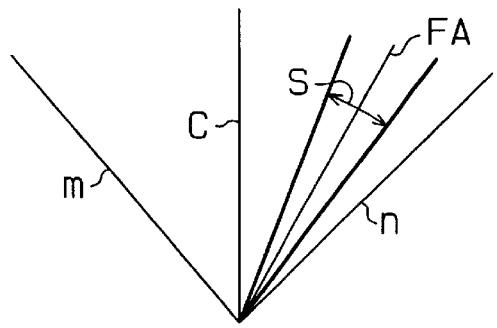
FIG. 8(a) is a diagram illustrating the center of a flux change when the center does not match the bisector of the angle defined by adjacent magnetic resistor.
Figure 8B:
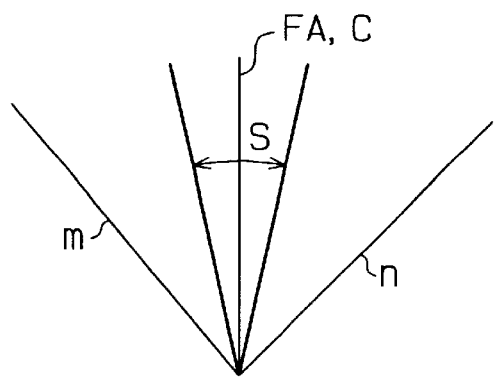
FIG. 8(b) is a diagram illustrating the center of a flux change when the center matches the bisector of the angle defined by adjacent magnetic resistors.

FIG. 8(a) shows a case where the flux change centerline FA does not match the arrangement centerline C of the magnetic resistors R1 to R4. FIG. 8(b) shows a case where the flux change centerline FA matches the arrangement centerline C. In FIGS. 8(a) and (b), the range of the flux change is designated as S. The lines m, n show the arrangement centerlines of magnetic resistors.

If the flux change centerline FA does not match the bisector C of the angle defined by the lines m, n, a flux change in the range S does not significantly change the resistance of the resistors arranged along the line m. However, in the case of FIG. 8(b), a flux change in the range S significantly changes the resistances of the magnetic resistors arranged along the line m and along the line n.

In the illustrated embodiment, the detecting body 10 includes the first to third magnetic resistance elements 13a, 14a, 15a and the first to third bias magnets 13b, 14b, 15b. The detecting body 10 is located between the magnetic path changer projections 6a to 6c and the hub 8. The flux from the first to third bias magnets 13b, 14b, 15b is therefore scarcely affected by noise. Also, the first to third magnetic resistance elements 13a, 14a, 15a accurately detect the changer projections 6a, 6b, 6c, which pass positions radially outside of the elements 13a, 14a, 15a.

In the illustrated embodiment, the magnetic path changer projections 6a, 6b, 6c are integrated with the rotor 2, which reduces the number of parts and reduces the number of manufacturing steps.

In the illustrated embodiment, the detecting body 10 is located between the changer projections 6a, 6b, 6c and the hub 8, which reduces the size of the sensor.

It should be apparent to those skilled in the art that the present invention may be embodied in many other specific forms without departing from the spirit or scope of the invention. Particularly, it should be understood that the invention may be embodied in the following forms.

In the illustrated embodiment, the directions of the arrangement of the magnetic resistors R1 to R4 are approximately forty-five degrees relative to the centerline FA, which matches the centerline of flux change. However, the relative angle is not limited to forty-five degrees and may be approximately thirty degrees, approximately thirty-five degrees or approximately forty degrees.

Therefore, the present examples and embodiments are to be considered as illustrative and not restrictive, and the invention is not be limited to the details given herein, but may be modified within the scope and equivalence of the appended claims.

What is claimed is:

1. A rotation detector comprising:
    a rotor including a shaft, wherein a plurality of axial projections are located at predetermined intervals about the rotor;
    a plurality of magnets located between the axial projections and the shaft;
    a plurality of magnetism detection elements, wherein each magnetism detection element detects magnetism of a corresponding one of the magnets and includes a plurality magnetoresistors;
    wherein a movement of the projections changes a flux of the magnets;
    wherein each magnetoresistor is switched between a first state, in which its electrical resistance is great, and a second state, in which its electrical resistance is small, and the magnetoresistors are divided into two groups, and wherein the groups are substantially symmetrical relative to a group centerline such that, when a direction of the flux changes, the magnetoresistors in one group are in the opposite state from that of the magnetoresistors in the other group; and
    wherein each magnet and associated magnetoresistors are positioned such that a centerline of changes in the direction of the flux caused by movements of the projections matches the group centerline.

2. The detector according to claim 1, wherein the direction of the arrangement of the magnetoresistors in one group is perpendicular to the direction of the arrangement of the other group, and wherein each of the magnetoresistors in each group zigzag such that segments of the current path of the magnetoresistors are perpendicular to the direction of the arrangement of the magnetoresistors.

3. The detector according to claim 2, wherein the direction of arrangement of the magnetoresistors in each group is inclined by forty-five degrees relative to the centerline of direction changes of the flux.

4. The detector according to claim 3,
    wherein the magnetism detection elements generate a voltage having a predetermined level in accordance with a direction change of the flux of the magnets.

5. The detector according to claim 4, wherein the projections comprise three projections, which are angularly spaced from one another by sixty degrees, wherein the magnets and the magnetism detection elements comprise three pairs, each pair including one of the magnets and one of the magnetism detection elements, and wherein the adjacent pairs of the three pairs are angularly spaced apart by forty degrees.

6. The detector according to claim 1, wherein a hub is integrated with the rotor.

7. The detector according to claim 1, wherein the magnetism detection elements are located at opposite positions from the magnets.

8. The detector according to claim 1, wherein the magnetoresistors are electrically connected to form a bridge circuit.

9. The detector according to claim 1, wherein the magnetoresistors are made of Ni—Co thin films.

* * * * *